(12) United States Patent
Canela Sacanell et al.

(10) Patent No.: US 11,089,730 B2
(45) Date of Patent: Aug. 17, 2021

(54) INTEGRATED DUAL-USE MACHINE FOR HARVESTING AND TREATING FRUIT ON TREES

(71) Applicant: COSECHADORAS ROLIF, S.L., Lleida (ES)

(72) Inventors: Jordi Canela Sacanell, Tarragona (ES); Antonio-Maria Canela Sacanell, Lleida (ES)

(73) Assignee: COSECHADORAS ROLIF, S.L., Lleida (ES)

( * ) Notice: Subject to any disclaimer, the term of this patent is extended or adjusted under 35 U.S.C. 154(b) by 213 days.

(21) Appl. No.: 16/230,935

(22) Filed: Dec. 21, 2018

(65) Prior Publication Data

US 2019/0200524 A1    Jul. 4, 2019

(30) Foreign Application Priority Data

Dec. 29, 2017  (ES) .............................. ES201731502

(51) Int. Cl.
*A01D 46/00*    (2006.01)
*A01D 46/26*    (2006.01)
(Continued)

(52) U.S. Cl.
CPC .......... *A01D 46/005* (2013.01); *A01D 46/26* (2013.01); *A01D 46/264* (2013.01);
(Continued)

(58) Field of Classification Search
CPC .... A01D 46/005; A01D 46/26; A01D 46/264; A01D 46/28; A01D 2046/262;
(Continued)

(56) References Cited

U.S. PATENT DOCUMENTS 3,006,131 A * 10/1961 McDowell ........... A01D 46/005
 56/330
3,276,194 A * 10/1966 Mohn .................. A01D 46/005
 56/330
(Continued)

FOREIGN PATENT DOCUMENTS

CA    2406493 A1    4/2004
EP    1597960 A1    11/2005
(Continued)

OTHER PUBLICATIONS

Search Report and Written Opinion for ES Application 201731502 dated May 14, 2018 in 6 pages.
(Continued)

*Primary Examiner* — Arpad Fabian-Kovacs
(74) *Attorney, Agent, or Firm* — Knobbe, Martens, Olson & Bear, LLP

(57) ABSTRACT

An Integrated dual-use machine is for harvesting and treating fruit on trees, in order to harvest the fruit when in season and treat the fruit on the tree with phytosanitary products. The machine includes a moveable structure, intended to shelter the fruit trees. The moveable structure includes a collection unit for the fruit that has been brought down, and is supported on one or two traction vehicles. The vehicles include at least one device for projecting and orienting air currents, at least one infrared camera, at least one collection belt, at least one load container, at least one conveyor belt that connects the collection belt to a load trailer, and a traction system that actuates tractor treads.

13 Claims, 19 Drawing Sheets

(51) Int. Cl.
*A01G 13/02* (2006.01)
*A01G 13/08* (2006.01)
*A01G 17/00* (2006.01)

(52) U.S. Cl.
CPC ......... *A01G 13/0212* (2013.01); *A01G 13/08* (2013.01); *A01G 17/005* (2013.01)

(58) Field of Classification Search
CPC .................. A01D 46/24; A01D 46/285; A01D 2046/268; A01G 13/0212; A01G 13/08; A01G 17/005; A01G 13/04; A01G 3/0408
See application file for complete search history.

(56) References Cited

U.S. PATENT DOCUMENTS

| | | | | |
|---|---|---|---|---|
| 3,473,310 A * | 10/1969 | Christianson | .......... | A01D 46/26 56/329 |
| 3,507,101 A * | 4/1970 | Bernshausen | .......... | A01D 46/24 56/1 |
| 3,635,004 A * | 1/1972 | Webb | ...... | A01D 46/24 56/235 |
| 3,656,282 A | 4/1972 | Rauth | | |
| 3,685,266 A * | 8/1972 | Mohn | ...... | A01D 46/28 56/330 |
| 3,720,050 A * | 3/1973 | Rozinska | ............ | A01D 46/005 56/330 |
| 3,979,891 A * | 9/1976 | Patton | ................ | A01D 46/005 56/328.1 |
| 4,179,873 A * | 12/1979 | Scudder | ................ | A01D 46/28 56/328.1 |
| 4,212,148 A | 7/1980 | Brownlee | | |
| 5,259,177 A * | 11/1993 | Windemuller | ....... | A01D 46/285 56/12.8 |
| 5,495,708 A * | 3/1996 | Scott | ...................... | A01D 46/28 56/329 |
| 5,647,194 A * | 7/1997 | Scott | ...................... | A01D 46/28 56/328.1 |
| 7,882,686 B2 * | 2/2011 | Bryan, Jr. | ............ | A01D 46/243 56/328.1 |
| 8,117,814 B2 * | 2/2012 | Sidhu | ..................... | A01D 46/28 56/329 |
| 9,497,902 B2 * | 11/2016 | Marrs | .................. | A01D 46/285 |
| 9,888,629 B2 * | 2/2018 | Williamson | ......... | A01D 46/264 |
| 9,894,840 B2 * | 2/2018 | Tenias Sancho | ..... | A01D 46/264 |
| 2008/0178570 A1 * | 7/2008 | Pellenc | .................. | A01D 46/28 56/328.1 |
| 2009/0120050 A1 * | 5/2009 | Constans | ............. | A01D 46/005 56/328.1 |
| 2015/0305254 A1 * | 10/2015 | Ehsani | ............... | A01G 13/0212 47/57.7 |
| 2015/0319930 A1 | 11/2015 | Marrs | | |
| 2017/0238465 A1 | 8/2017 | Bodtke et al. | | |

FOREIGN PATENT DOCUMENTS

| | | |
|---|---|---|
| GB | 151933 A | 12/1921 |
| WO | WO 2007/021271 | 2/2007 |
| WO | WO 2009/103008 | 8/2009 |
| WO | 2010063075 A1 | 6/2010 |

OTHER PUBLICATIONS

European Search Report for Application No. 18212275.4, dated May 17, 2019 in 7 pages.

\* cited by examiner

INTEGRATED DUAL-USE MACHINE FOR HARVESTING AND TREATING FRUIT ON TREES

CROSS-REFERENCE TO RELATED APPLICATIONS

This application claims priority to Spanish Patent Application No. P 201731502 filed on Dec. 29, 2017, the disclosure of which including the specification, the drawings, and the claims is hereby incorporated by reference in its entirety.

FIELD OF THE INVENTION

The present invention relates to an integrated dual-use machine for harvesting and treating fruit on trees.

The expression 'dual-use' in the title refers to the possibility that the machine that will be described can be used for a dual function: the treatment of trees and fruit during the growth and ripening thereof, and the harvesting (bringing down) of the fruit from the trees at the opportune moment in the ripening thereof.

The expression 'integrated' refers to the configuration of the novel machine, which combines within its structure all the elements required to perform the functions for which said machine is intended.

BACKGROUND OF THE INVENTION

Machines designed to carry out various treatments on fruit trees and for collecting the fruit thereof are known.

Among the proposed installations and machines specific to harvesting for these purposes, Spanish utility models ES200002889U and ES200002278U may be mentioned, both in the name of Tenias, S.A. and which comprise fixed sloping panels and a vibrator for bringing down the fruit. Another example of a machine is found in European patent application EP1597960A1, which comprises devices for the treatment or bringing down of fruit using air currents.

At the moment, existing machines, provided with vibrators for bringing down the fruit, have drawbacks resulting from being poorly adapted to rational harvesting based on the state of ripeness of the fruit. In addition, the slowness of the work causes the premature fall of ripe fruit, as well as a loss of yield due to unripe (green) fruit.

In addition, the mishandling to which the fruit is subject when brought down, fallen and collected in nets or blankets, such as damage to the bark of young trees and also to the vegetation by the breaking of the young stems that produce the next harvest as a result of said 'shaking down' of the trees and the vegetation in general, should be mentioned.

Known machines which are provided with means for projecting air currents, waste energy by producing gusts in random current directions without distinction as to the ripeness of the pieces of fruit.

There are also drawbacks related to the slowness of the known types of vehicles used and the impossibility of driving said vehicles on the roads. Moreover, said vehicles have little flexibility in loading the brought down fruit into containers, as the loading vehicles must remain adjacent to the machine.

Furthermore, the branches of trees in adjacent rows may invade the space of the vehicle, causing hazards and breaking branches.

When trees are situated at the edges of a piece of terrain, it is often impossible to bring down the fruit thereof owing to the proximity of obstacles such as fences or pronounced slopes, among other things, which prevent the traction vehicle from moving near enough to reach the entire tree.

SUMMARY OF THE INVENTION

The present document discloses an integrated dual-use machine which aims to overcome the above-mentioned drawbacks.

In particular, the present document discloses an integrated dual-use machine for harvesting and treating fruit on trees, in order to harvest the fruit when in season and treat said fruit on the tree with phytosanitary products, characterised in that said machine comprises a moveable structure, intended to shelter the fruit trees within, said moveable structure comprising a collection unit for the fruit that has been brought down, said moveable structure being supported on two traction vehicles, each of said vehicles comprising:
a) at least one device for projecting and orienting air currents,
b) at least one infrared camera,
c) at least one collection belt,
d) at least one load container,
e) at least one conveyor belt which connects the collection belt to the load container,
f) a traction system which actuates
g) tractor treads Optionally, said moveable structure comprises a cover and side screens of which the purpose is to prevent fruit from leaving the collection enclosure and, at the same time, to also prevent phytosanitary products from leaving the collection enclosure when said products are being applied to the tree. The screens may be either mechanical, consisting of hatches, or pneumatic, consisting of air currents.

Optionally, said devices for projecting and orienting air currents comprise means for controlling the direction of the currents, in accordance with information provided by infrared cameras. The currents are thus focussed only on the fruits that are actually to be brought down, resulting in a saving of energy.

Preferably, said devices for projecting and orienting air currents are arranged on guides which allow said devices to move on said guides at a speed that can be regulated at will and independently of the supporting platform.

In one embodiment according to the present invention, said conveyor belt comprises a vertical belt and a high horizontal belt with a length of approximately the distance between rows of trees.

Optionally, said traction vehicles comprise load containers connected to said collection belt by a conveyor belt, at least one protective telescopic bulkhead, and wheels with tyres capable of supporting the vehicle.

In one embodiment according to the present invention, said mechanical screens are connected to sensors for the automatic positioning thereof.

Preferably, said wheels with tyres are connected to an articulated support which allows said wheels to descend until contact is made with the ground, and also to lift the entire vehicle for transport thereof, with the possibility of operating the functions of the machine in the field for phytosanitary treatments or for harvesting, thus exceeding the maximum possible speed of the tractor treads.

In one embodiment according to the present invention, said traction vehicles comprise a chassis which can move relative to the tracks, wheels, or wheels and driving tracks, and are provided with self-guiding and control means so as to remain automatically side by side during the operation, said tracks being of the caterpillar tractor type.

Optionally, said covers are foldable and form the upper portions of said moveable structure, said covers being supported by telescopic elements which allow the height of the covers to be adjusted and the folding thereof for transport.

Optionally, said traction vehicles carry controlled-pressure air current generators for bringing down and then moving the fruit brought down and the operation of the various pneumatic devices, a metering tank for regulating the phytosanitary product in dry or damp powder form, by injecting liquid at the air outlet, and an electric power unit for supplying the electric devices and motors and for the installation of lighting for operating the machine at night.

Preferably, the collection unit comprises:
a) extendable collection trays, made up of flat, overlapping telescopic elements, inclined at variable angles, actuated by cylinders and coupled to the traction vehicles by articulation mechanisms;
b) plates associated with a support of the collection unit made up of collection trays which can be coupled to fit around the bases of the trees, said support being provided with air current projection devices to push the fallen fruit toward said collection belts of the traction vehicles.

Optionally, the elements of the collection unit can be moved from an operational position in which the assembly is applied, with the required incline, to the trees to a non-operational folded position, oriented practically vertically, to allow the machine to be moved.

In one embodiment according to the present invention, the devices -12- supporting the collection units are, at the same time, blowers for pushing the fruit that has been brought down toward the collection devices -13-.

The integrated dual-use machine according to this patent comprises a set of functional devices which define a moveable structure, intended to move continuously and on any type of terrain along a row of fruit trees, which also carries means for the application by spraying of particular phytosanitary products onto the trees and/or bushes and onto the fruit thereof, and onto non-intensive low crops, means for bringing down the fruit, means for collecting the fruit that has been brought down, and means for taking and transporting the fruit to load containers inside or outside said installation.

The novel machine basically defines a structure with a form and dimensions that can be adjusted, and are appropriate to those of the various fruit trees and/or bushes, being adapted to the configuration and size thereof owing to the versatility of the structure, prior to the start of the functional operations carried out by and on the devices concerned, all of which can be adjusted during operation.

The machine in question may be used on any type of terrain, in regular plantations of trees and/or bushes of any age and size (from first fruiting) and optionally from tree to tree in less satisfactory plantations and terrains with sloping ground. The mechanisms do not make contact with the pieces of fruit or vegetation, apart from that of the moveable plates that fit around the bases of the plants, including those with two or more bases or trunks, such as olive trees.

The treated and harvested fruit may be dry fruit (almonds, hazelnuts, etc.) or fresh fruit (citrus fruit, oily fruit, etc.) mainly in industrial production.

The environment is fully respected in using the novel machine, since the phytosanitary products used, where appropriate, for spraying the fruit are kept inside the enclosure defined by the installation. Moreover, the use of treatment products is rationalised, which are consumed in the amounts that are strictly necessary, with excess amounts being recovered and recycled, producing great savings in product treatment costs and in time.

To prevent the fruit that has been brought down from falling to the ground near the trunk or trunks, the collection unit comprises plates which make contact with the tree. Said plates are articulated strips that can rotate about a vertical axis, perpendicular to the ground, and which comprise springs which hold said plates in position. When the tree passes the plates are rotated by contact with the trunk to cover the maximum area around the trunk.

The fruit is brought down in successive passes, preferably by blowing with air currents at the appropriate speed and output, which can be adjusted as required, produced by devices indicated for bringing down fruit while at the same time obtaining a natural classification of the fruits that are at optimal ripeness due to the loss of strength of the stalk in their natural cycle of growth and maturity. The ripeness of the pieces to be brought down is verified by the liquid content of the fruit, which is determined, prior to bringing down, using infrared cameras as a harvesting control. Said cameras are positioned at the edges of the covers and on the telescopic supports of the covers, that is, at the entry area to the moveable enclosure.

The devices for generating and projecting air currents comprise, respectively, internal and external moveable blades, with alternating movement therebetween, for the orientation of the air in two directions, perpendicular to one another, horizontally and vertically, forming a swirl of air. Said devices are mounted on a tower of variable height.

The infrared cameras detect the position and degree of ripeness of the fruit. This allows the air currents to be directed only at the regions where the fruit is sufficiently ripe (in season). This feature allows energy to be saved because the currents are used only if really necessary and effective, rather than blowing continuously and randomly which increases consumption and does not discern the ripeness of the pieces of fruit.

The fruit is also pushed pneumatically (by air) toward the collection belt of the collection unit. All this is achieved without contact of any mechanical element with the trees, which therefore are not damaged, and neither is any fruit that is still not in season.

The collection unit receives the fruit that has been brought down using trays that can be adapted to the drop (fall) region and up to the base or bases of the trees, which trees may be of any height from a minimum of 20-25 cm up to 5-6 metres or more. Moveable plates are used with dimensions to suit trees with one, two or more bases or trunks, which allows said trunks to pass therethrough.

The machine described comprises a system for carrying out the functions of bringing down the fruit and phytosanitary treatment of the trees, based mainly on mechanical, pneumatic, hydraulic, electric and/or electronic devices, with elements and contacts that are interconnected for the actuation and/or regulation of said devices while in motion.

The assembly is mounted on one or two chassis or self-propelled, or drawn, vehicles, with wheels and tracks and with reliable levelling and reinforcing means according to the incline of the ground. Said self-propelled vehicle or vehicles comprise a motor to provide traction to the assembly and to allow said vehicle to move. By using the wheels, the vehicle or vehicles can increase speed during operation and can also be driven on the highway.

The platform of the chassis can move relative to the wheels and tracks and can therefore reach trees situated in regions that are difficult for said wheels and tracks to access. This feature facilitates access to trees situated at the edges of the terrain.

One or two of such chassis are used, one on either side of the row of trees, operating in parallel on either side, with telescopic hatches and supports that are assembled and can be regulated in width and in height by pneumatic and hydraulic cylinders. Said chassis are also provided with self-guiding means that centre one side relative to the other, so that each automatically centres its position relative to the other. Thus, the assembly of the two vehicles can be driven by a single operator.

BRIEF DESCRIPTION OF THE DRAWINGS

To facilitate explanation, the present description is accompanied by drawings in which examples of embodiments of an integrated dual-use machine for harvesting and treatment of fruit on trees are shown, as an illustrative and non-limiting example.

DETAILED DESCRIPTION OF THE PREFERRED EMBODIMENTS

Figure 1:
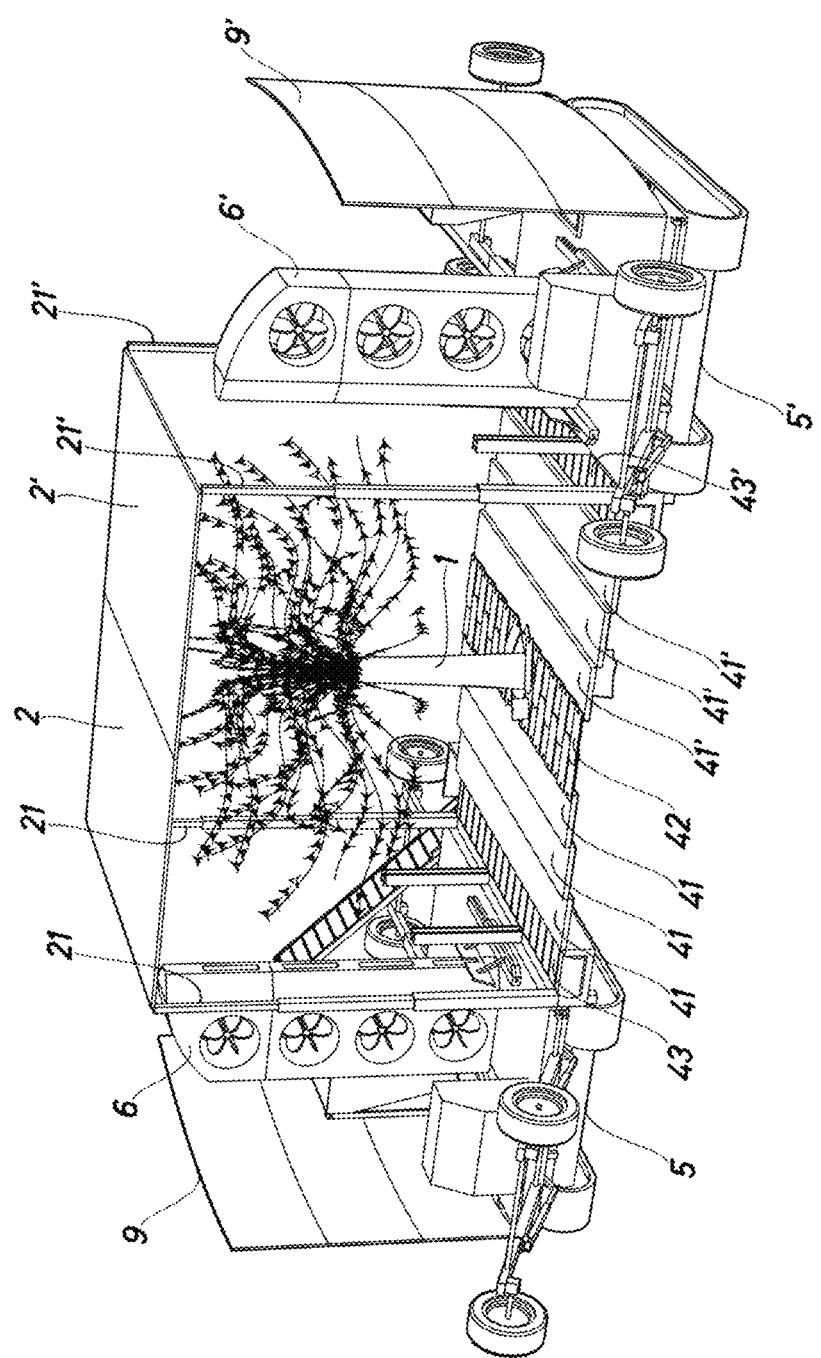
FIG. 1 is a schematic view in perspective of a general structure of an integrated dual-use machine according to the present invention, passing parallel to a row of fruit trees during the harvesting, bringing down or treatment phase.

FIG. 1 shows an embodiment of the integrated dual-use machine according to the present invention, which comprises a moveable structure intended to surround a fruit tree or bush -1- in its interior. Said structure is made up of covers -2-, -2'-, side screens (not shown in FIG. 1) and a collection unit.

The covers -2-, -2'- are on the upper portion of the structure, on telescopic supports -21-, -21'- which allow the height thereof to be adjusted. Said covers -2-, -2'- are connected in an articulated manner to said supports -21-, -21'- and it is therefore possible to place said supports in a vertical position for transport, and in a horizontal position to place one in contact with the other in order to cover the tree -1-.

The fruit that has been brought down falls onto the collection unit, which comprises extendable collection trays -41-, -41'-, made up of flat, overlapping, telescopic elements, which when extended are arranged between the traction vehicle and some plates -42- which allow the trunks to pass.

The elements of the moveable structure are supported on two traction vehicles -5-, -5'-, on which the air projection devices -6-, -6'-, which are the ones responsible for bringing down the fruit, are situated. Said devices -6-, -6'- comprise means for creating and orienting jets of air, with the option of spraying a phytosanitary product in a liquid state or in a dry or damp powder form on the tree.

Collection belts -43-, -43'- receive the pieces of fruit which come from said collection trays -41-, -41'- and take said pieces to other belts which transport said pieces to the load containers or trailers following in the adjacent row.

Figure 2:
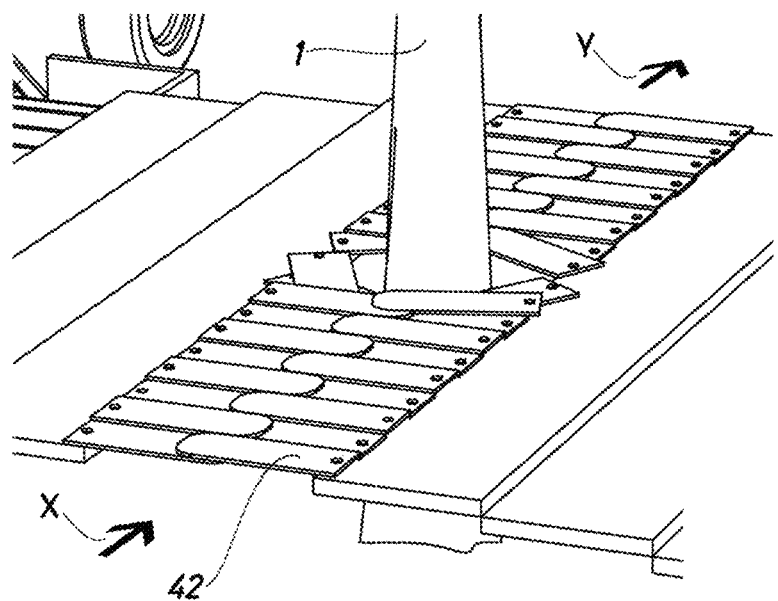
FIG. 2 shows a detail in perspective of the tree passing through the plates of the collection unit in an embodiment of a machine according to the present invention.

FIG. 2 shows a detail of the movement of the moveable structure when acting on a tree -1-, where the arrows x, y indicate the direction of movement of the moveable structure. The movement of the plates -42- as the tree -1- passes therethrough can be seen.

Figure 3:
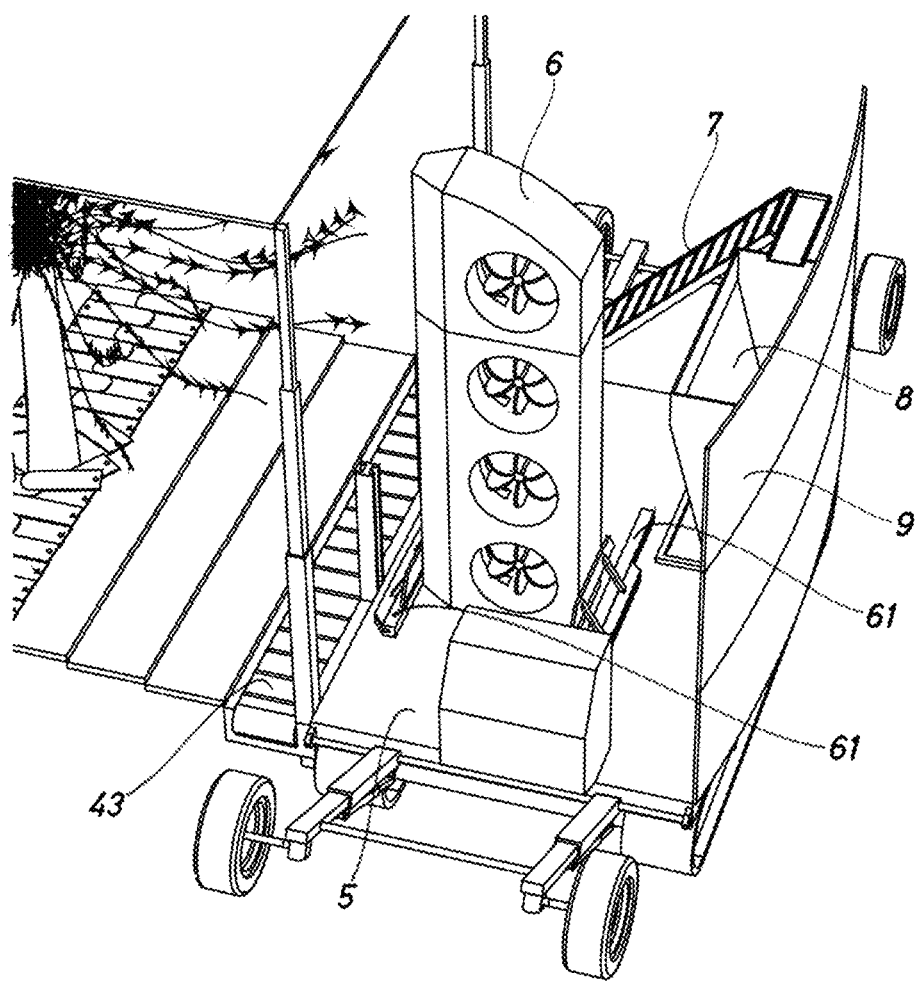
FIG. 3 is a perspective view from the upper portion of one half of an embodiment of an integrated dual-use machine according to the present invention.

As shown in FIG. 3, a conveyor belt -7- receives the pieces of fruit coming from the collection belt -43- and transports said pieces to a load container -8- situated on the vehicle -5-. At the side of said containers -8-, on the portion farthest from said structure, telescopic bulkheads -9- protect the platform of the vehicle from possible incursions, such as by the branches or twigs of the trees, for example.

Said air projection devices -6- and -6'- move along longitudinal guides -61- at an assigned back-and-forth speed which can be adjusted and is independent of the platform supporting said devices.

Figure 4:
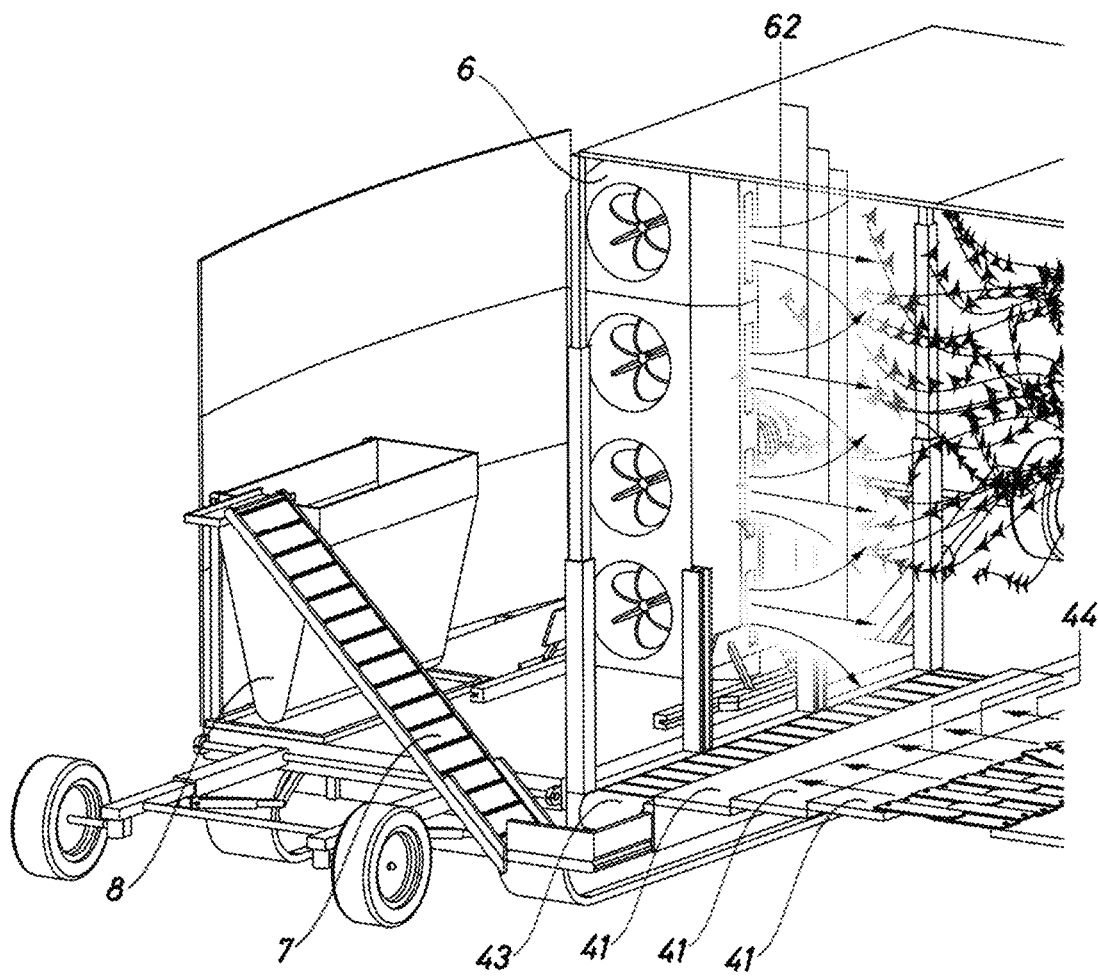
FIG. 4 is a perspective view of one half of an integrated dual-use machine according to the present invention, seen from the conveyor belt portion.

FIG. 4 shows in detail the connection between said collection belt -43- and the conveyor belt -7- and the opening of said conveyor belt into a load container -8-. Also shown schematically in FIG. 4 are the air currents -62- of the device -6-. Said currents -62- bring down the fruit from the trees depending on their degree of ripeness, causing said fruit to fall onto the collection trays -41-. Said trays -41- have a system which projects air currents -44- which push the fallen fruit towards the collection belt -43-, which may optionally be rotary belts carrying the fruit that has been brought down to the collection belt.

Figure 5:
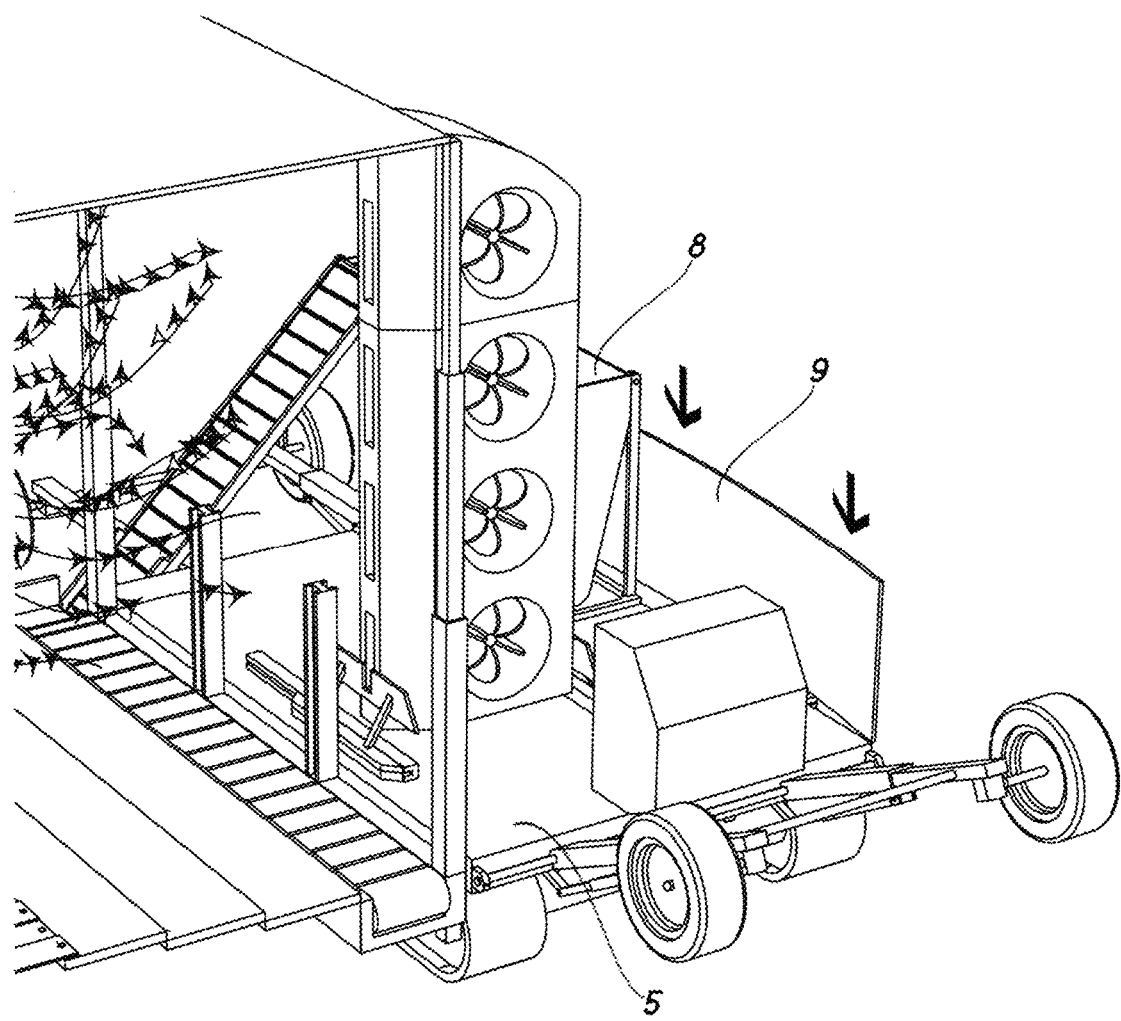
FIG. 5 is a perspective view of one half of an embodiment of an integrated dual-use machine according to the present invention, indicating the movement of the telescopic bulkheads.

In one embodiment of the invention the fruit that has been brought down is stored in load containers situated on the traction vehicle. To empty said containers -8- the bulkheads -9- are taken down to their lower position as shown in FIG. 5.

Figure 6:
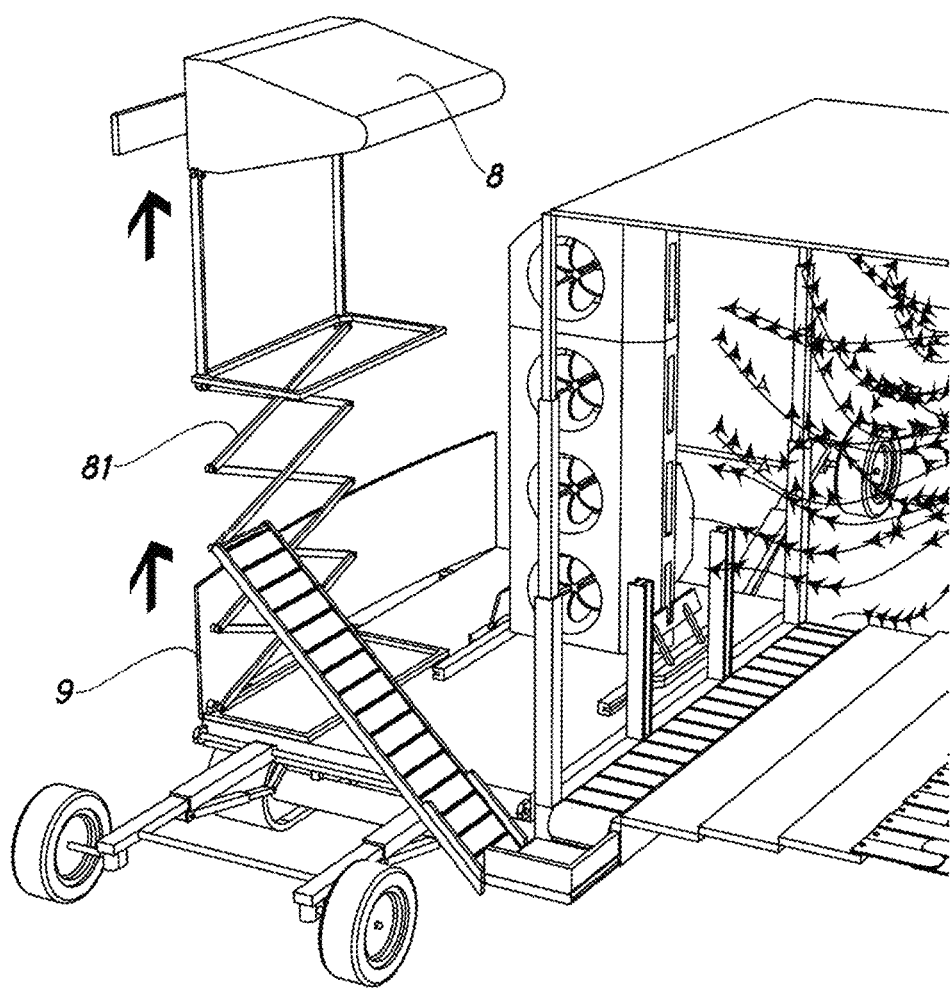
FIG. 6 is a perspective view of one half of an embodiment of an integrated dual-use machine according to the present invention, indicating the movement of the load containers.

FIG. 6 shows said containers -8-, which are articulated on a telescopic support -81- which allows said containers to be lifted and tipped over in order to empty the load into a trailer or similar (not shown). As mentioned in the previous paragraph, at this moment the telescopic bulkheads -9- are lowered to allow unloading.

Figure 7:
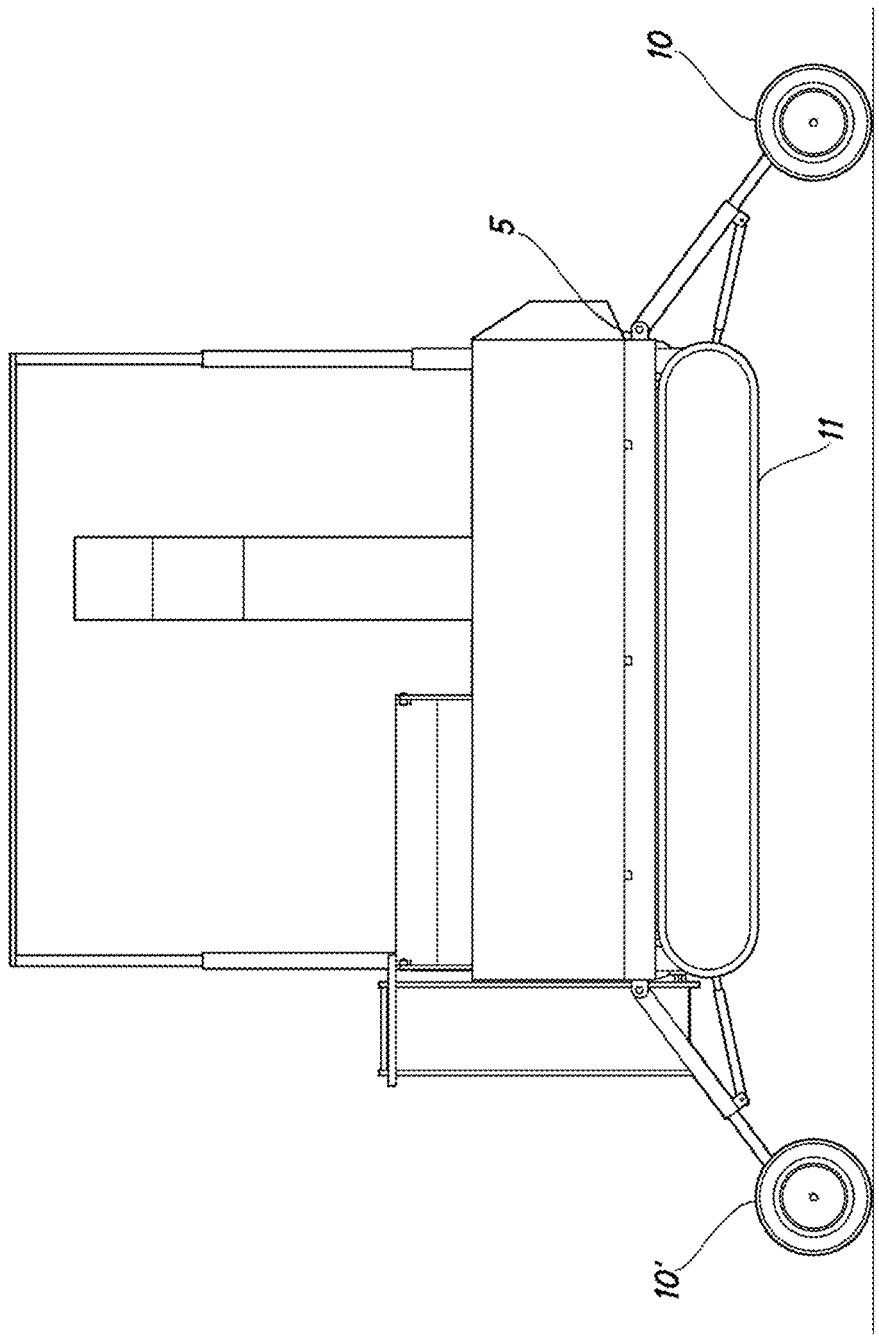
FIG. 7 is a side view of an embodiment of an integrated dual-use machine according to the present invention, at a time when traction is provided only by wheels.

The vehicles normally travel on caterpillar-type tractor treads when operational, at which time the wheels are raised. However, as shown in FIG. 7, a system allows the wheels -10- to be lowered until contact is made with the ground with the option of lifting the vehicle -5- so that the tracks -11- are not in contact with the ground.

Figure 8:
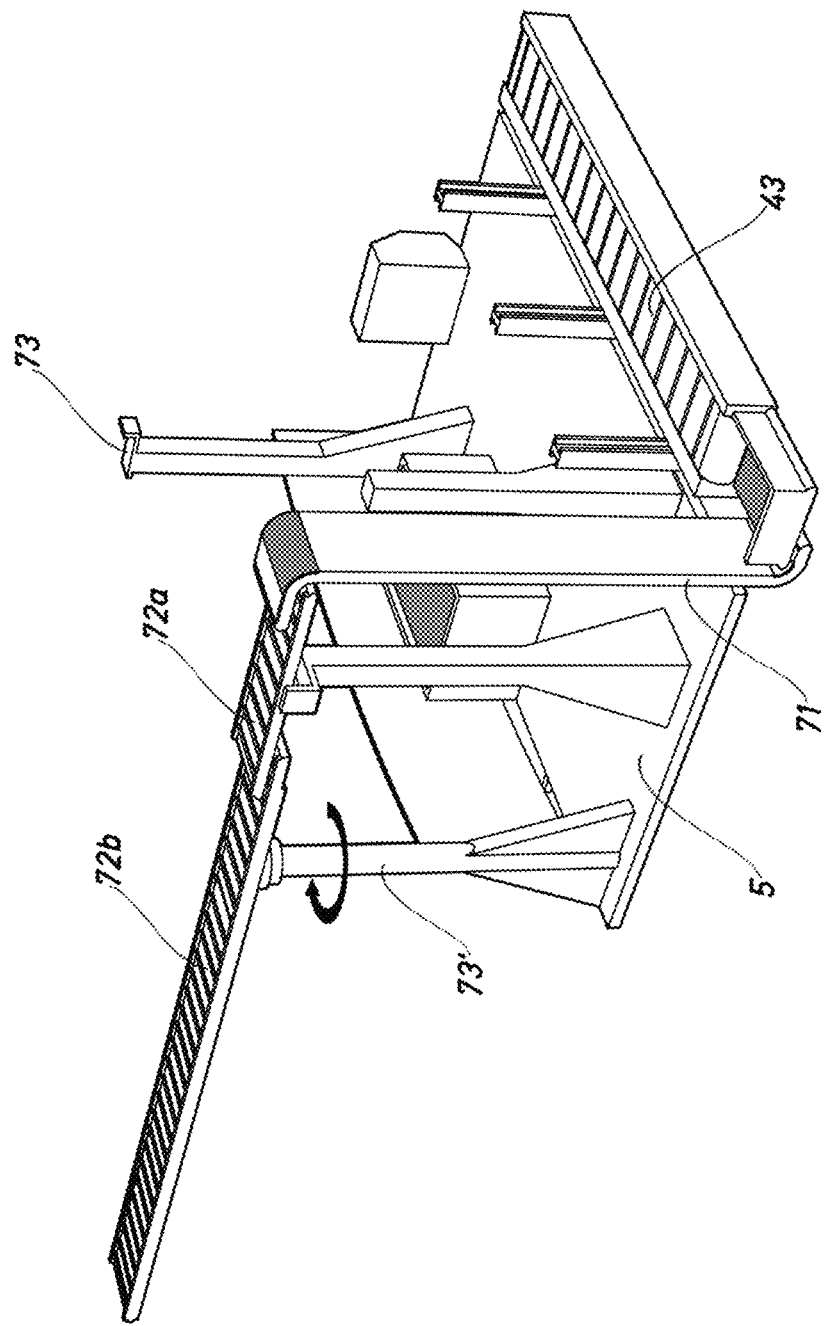
FIG. 8 is a perspective view of another embodiment showing a region of a traction vehicle according to the present invention where the conveyor belt is shown in the operating position.
Figure 9:
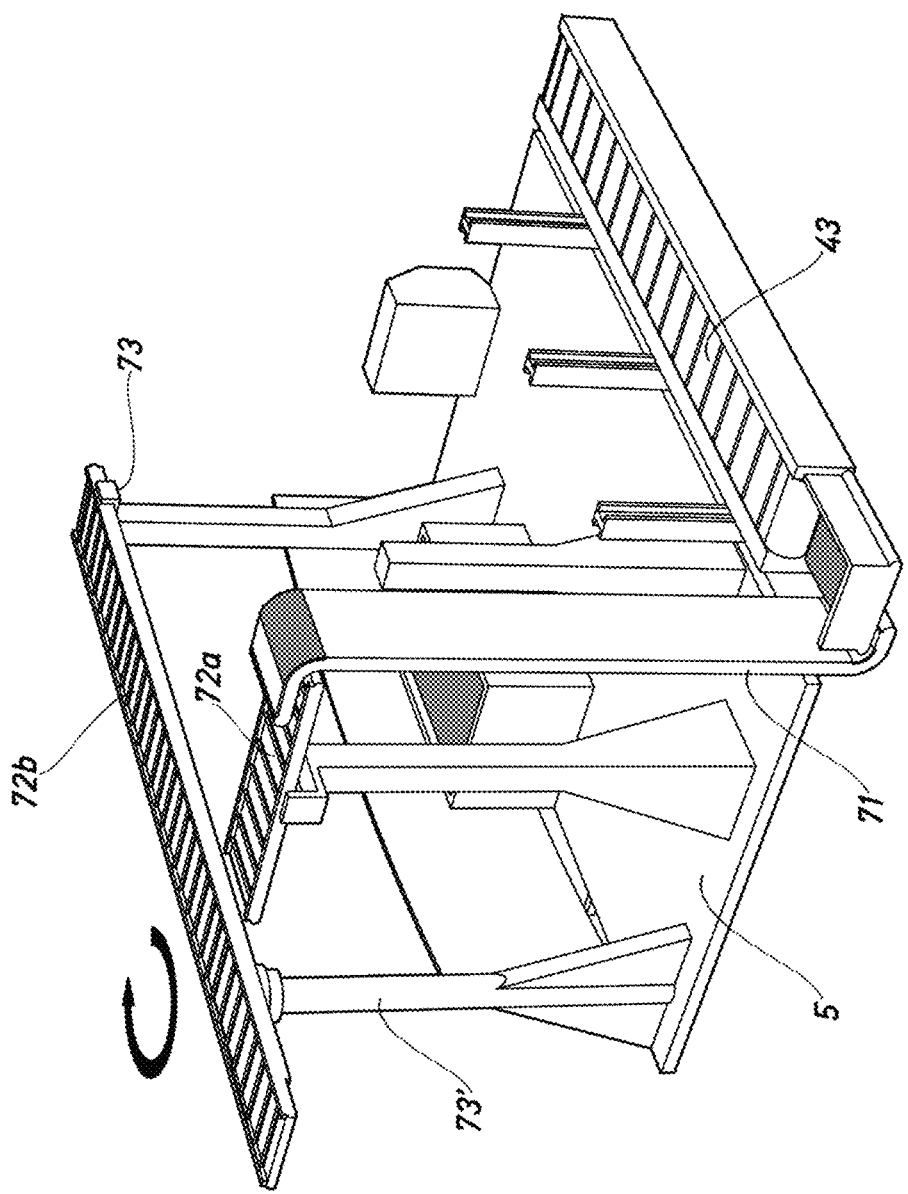
FIG. 9 is a perspective view similar to that of FIG. 8, but showing the conveyor belt when not in use.

In a second preferred embodiment of the invention shown in FIG. 8, the conveyor belts transport the fruit in bulk directly to the trailers which accompany the machine for bringing down fruit from the adjacent lane and row, allowing the containers situated on the platform of the trailer also to be filled in order to safeguard the quality of the fruit by immersion in emulsions that promote the quality thereof.

to load containers which are situated outside the vehicle, allowing loading into containers which are positioned, for example, in an adjacent row of trees. In this case transport is on a vertical belt -71- which lifts the pieces of fruit, and a horizontal belt which transports said fruit to a load container. The horizontal belt is divided into a fixed portion -72a- and a portion -72b- which rotates relative to the axis -73'- and which rests at one end on a support -73- when the machine is not operational, as shown in FIG. 9.

Figure 10:
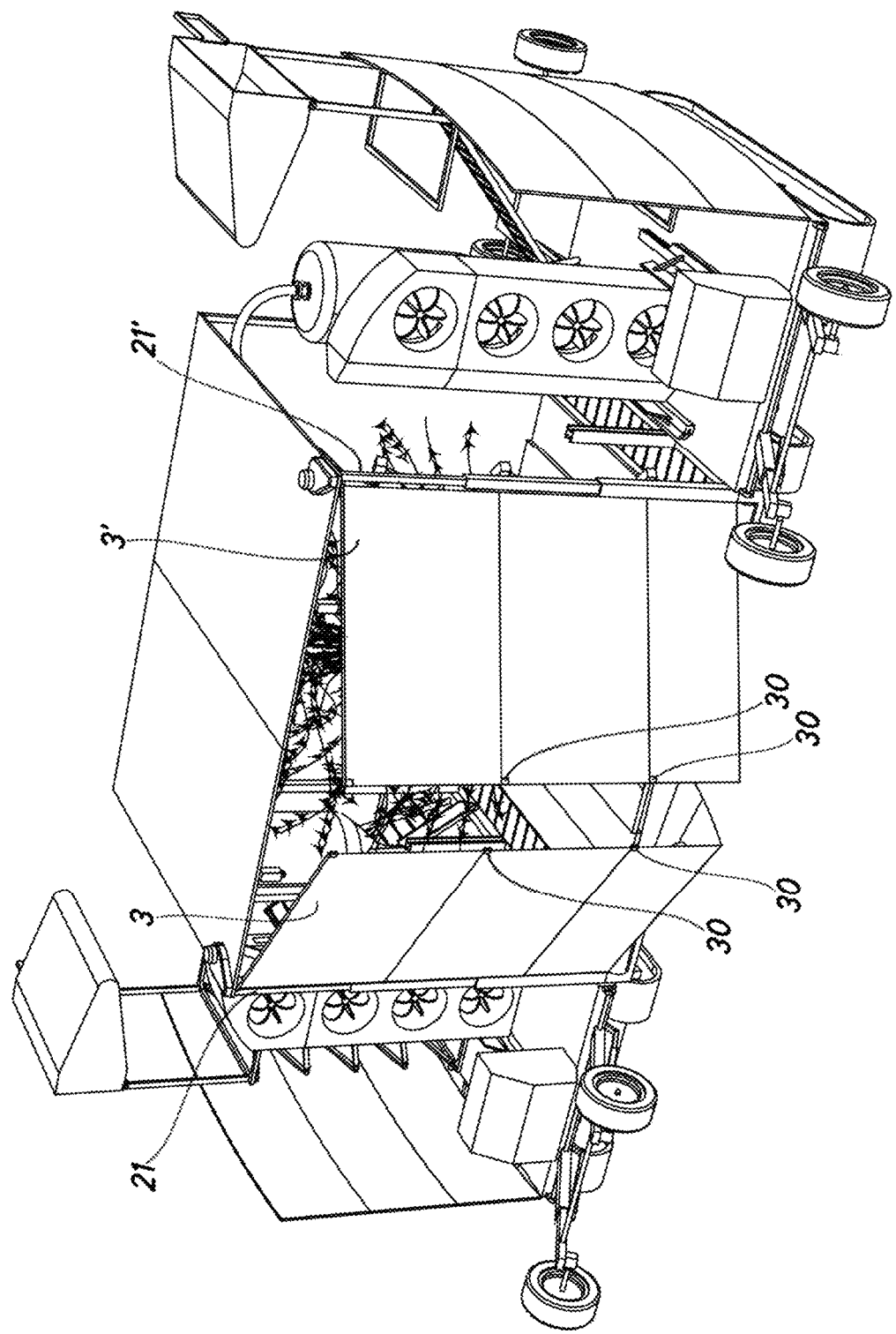
FIG. 10 is a perspective view of an embodiment of an integrated dual-use machine according to the present invention which incorporates a system of hatches.
Figure 11:
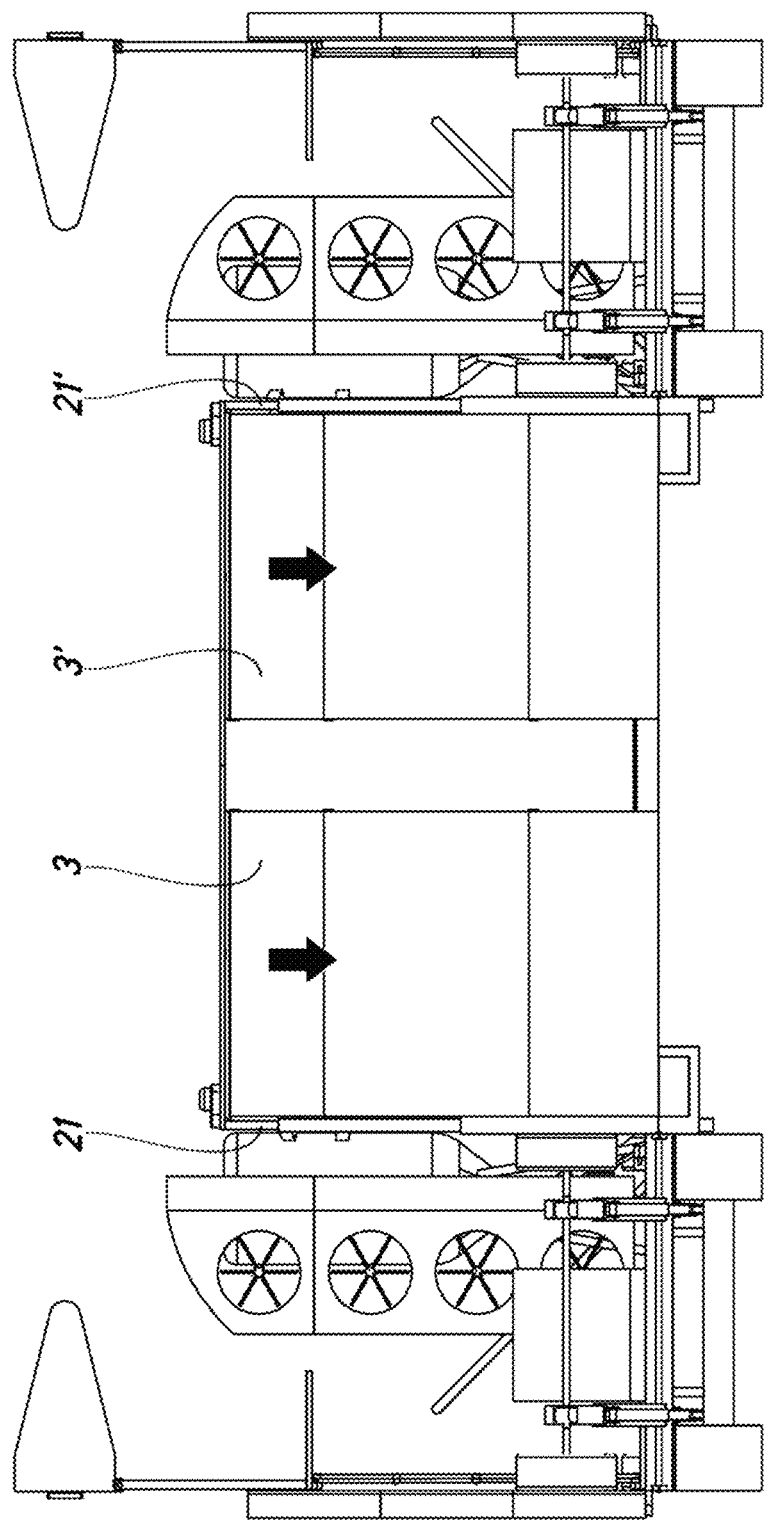
FIG. 11 is a front view of the embodiment of an integrated dual-use machine of FIG. 10.

FIG. 10 shows the mechanical side screens consisting of hatches -3-, -3'-, which are arranged at the entry and at the exit of the moveable enclosure, articulated on the telescopic supports -21-, -21'-. Sensors -30- arranged at the edges of the hatches -3-, -3'- detect the dimensions of the tree or bush which is passing through said enclosure and automatically open and close to allow the trees to enter and leave said enclosure. The objective is to keep the interior region of the structure as sealed as possible to prevent pieces of fruit or phytosanitary products from exiting said enclosure. Said hatches -3-, -3'- are also telescopic so that the height thereof coincides with that of said supports -21-, -21'-. FIG. 11 shows with arrows the lowering movement of the hatches -3-, -3'- together with the supports -21-, -21'-.

Figure 12:
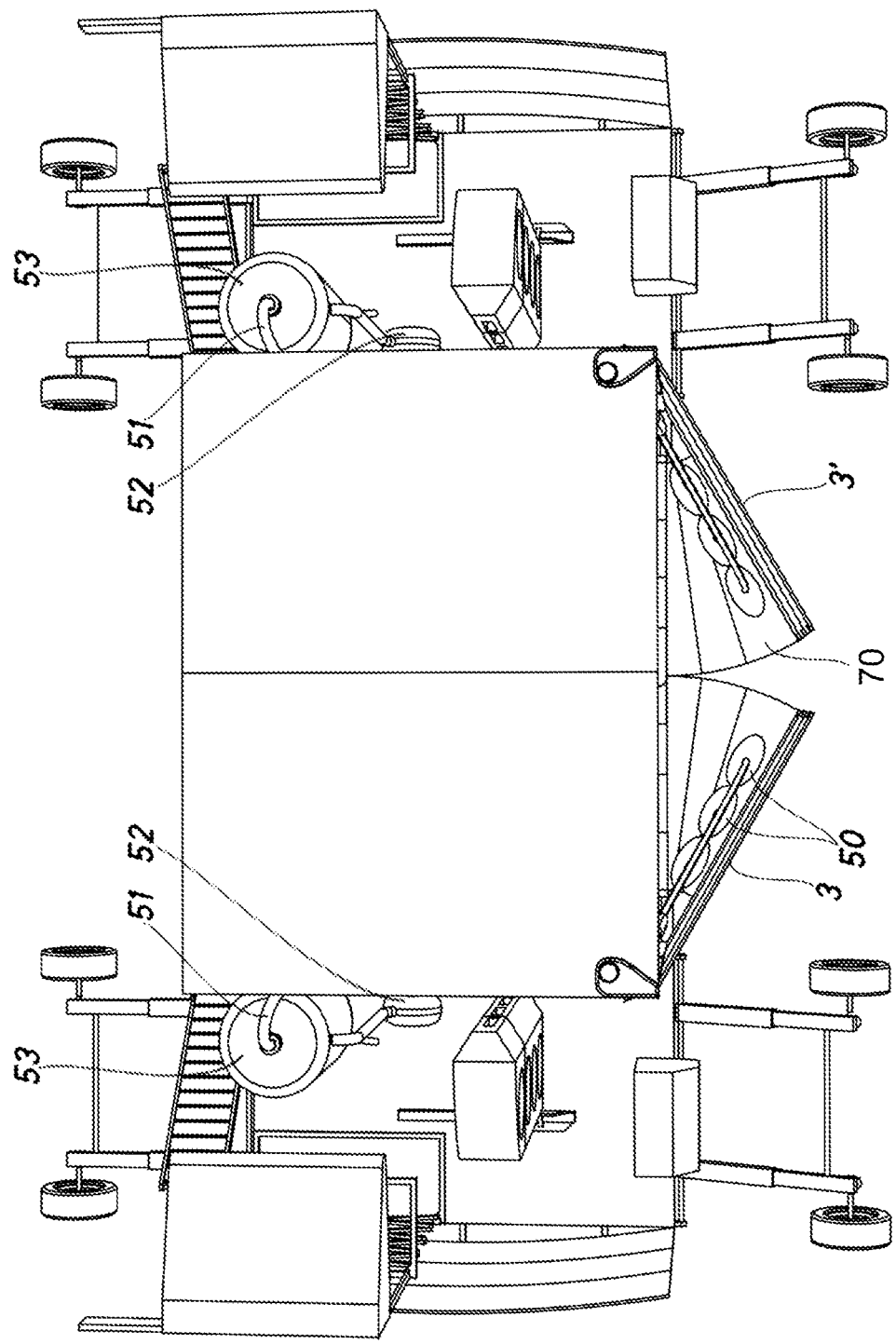
FIG. 12 is a plan view of the embodiment of an integrated dual-use machine of FIG. 10.
Figure 13:
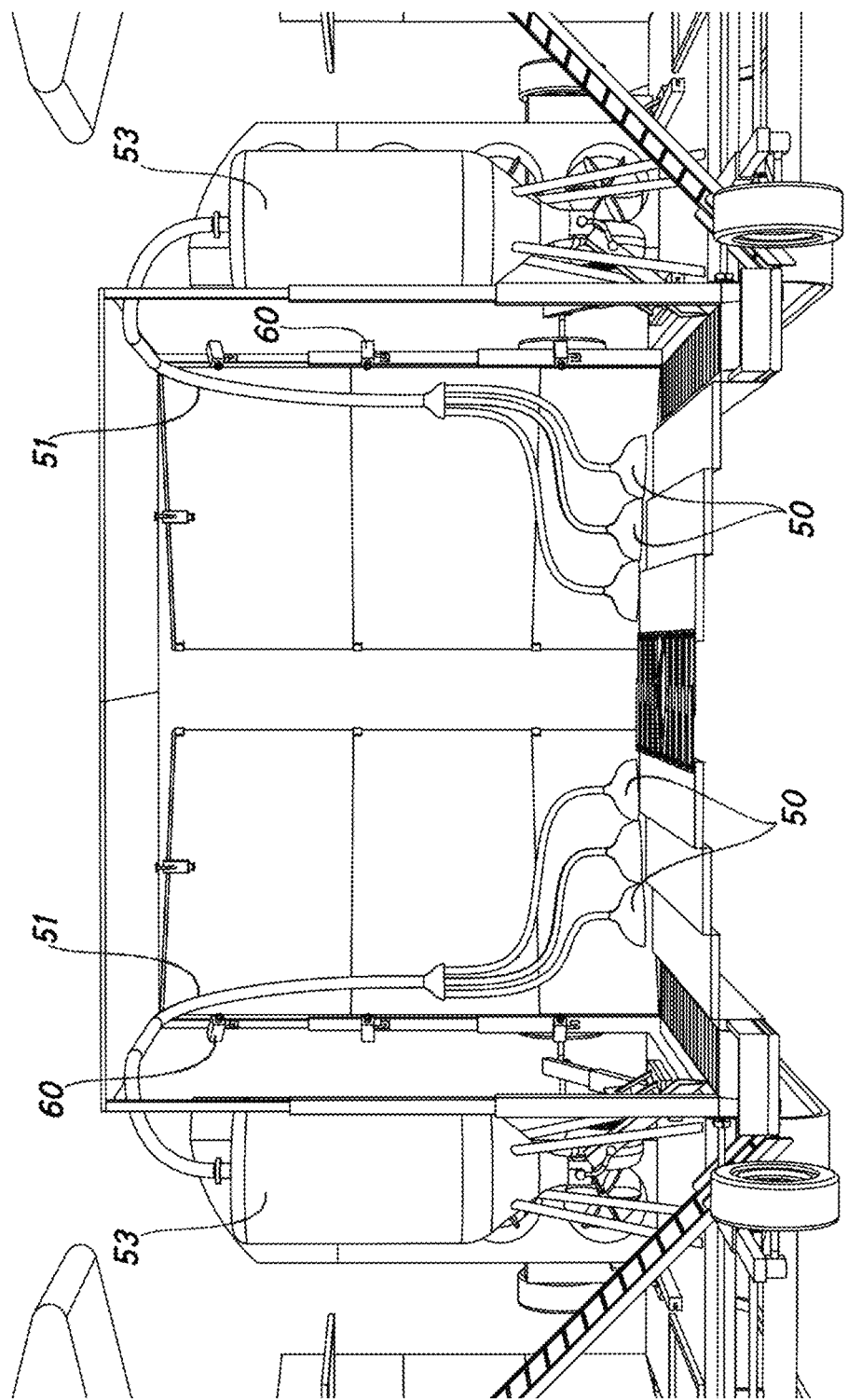
FIG. 13 is a rear view of the embodiment of an integrated dual-use machine of FIG. 10.

FIGS. 12 and 13 show that the hatches are connected to the collection unit by bellows -10- with strips so that when the hatches -3-, -3'- are open the bellows -70- with strips occupy the area swept by the hatches -3-, -3'- and prevents the pieces of fruit that have been brought down from falling to the ground. Suction openings -50- actuated by a turbine -52- open in said bellows -70- so as to suck up the pieces of fruit found there. These pieces travel to a tank -53- along suction tubes -51- and the pieces collected are discharged directly from said tank -53-.

The positioning of the infrared cameras -60- can be seen in more detail in FIG. 13, showing how said cameras are focused toward the interior of the moveable enclosure.

Figure 14:
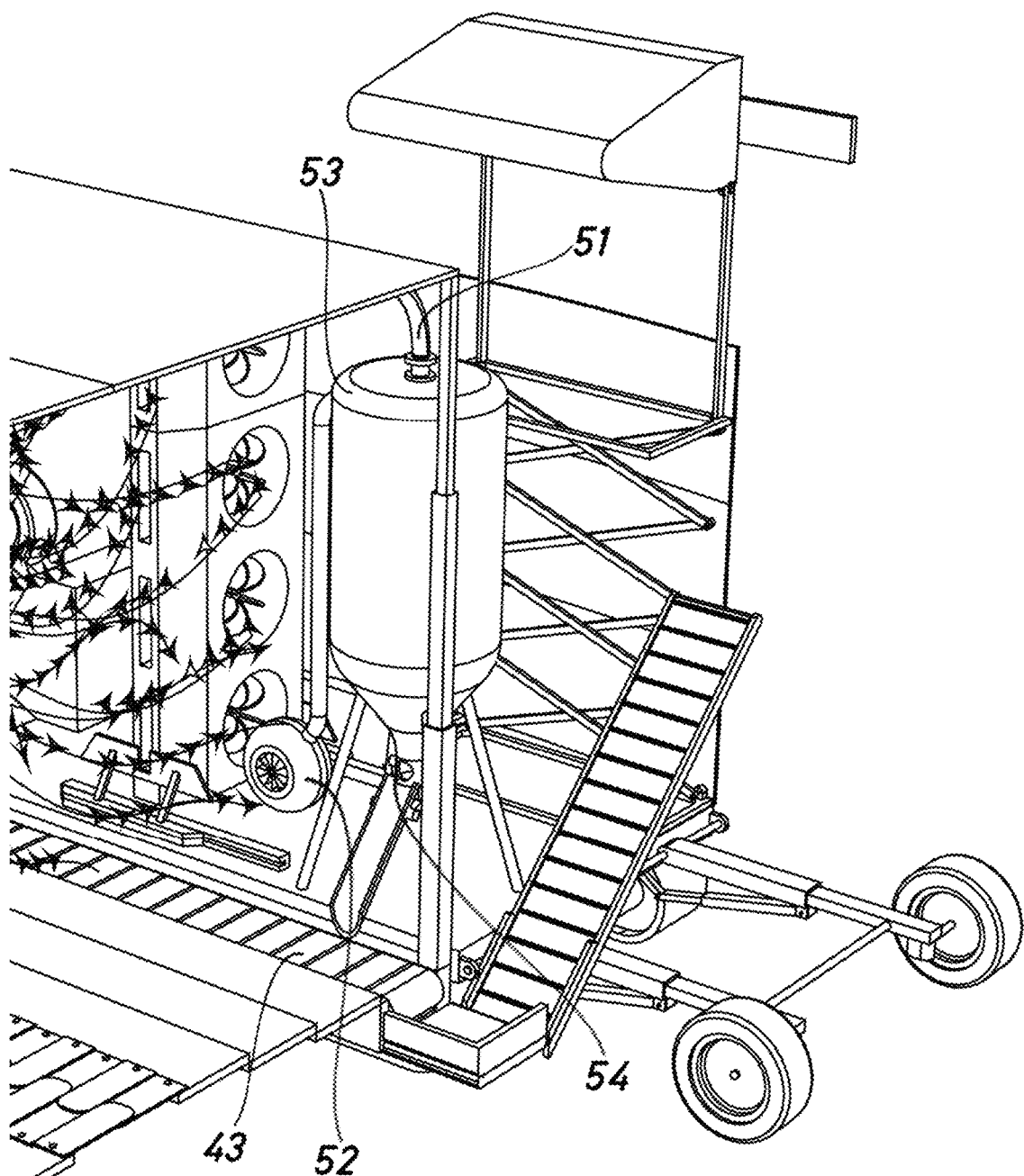
FIG. 14 is a perspective view of a region of the embodiment of an integrated dual-use machine of FIG. 10.

FIG. 14 shows in greater detail the tank -53- and the lower opening thereof -54- through which the sucked-up fruit is discharged toward the collection belt -43-. It also shows the turbine -52-, which creates the suction air current.

Figure 15:
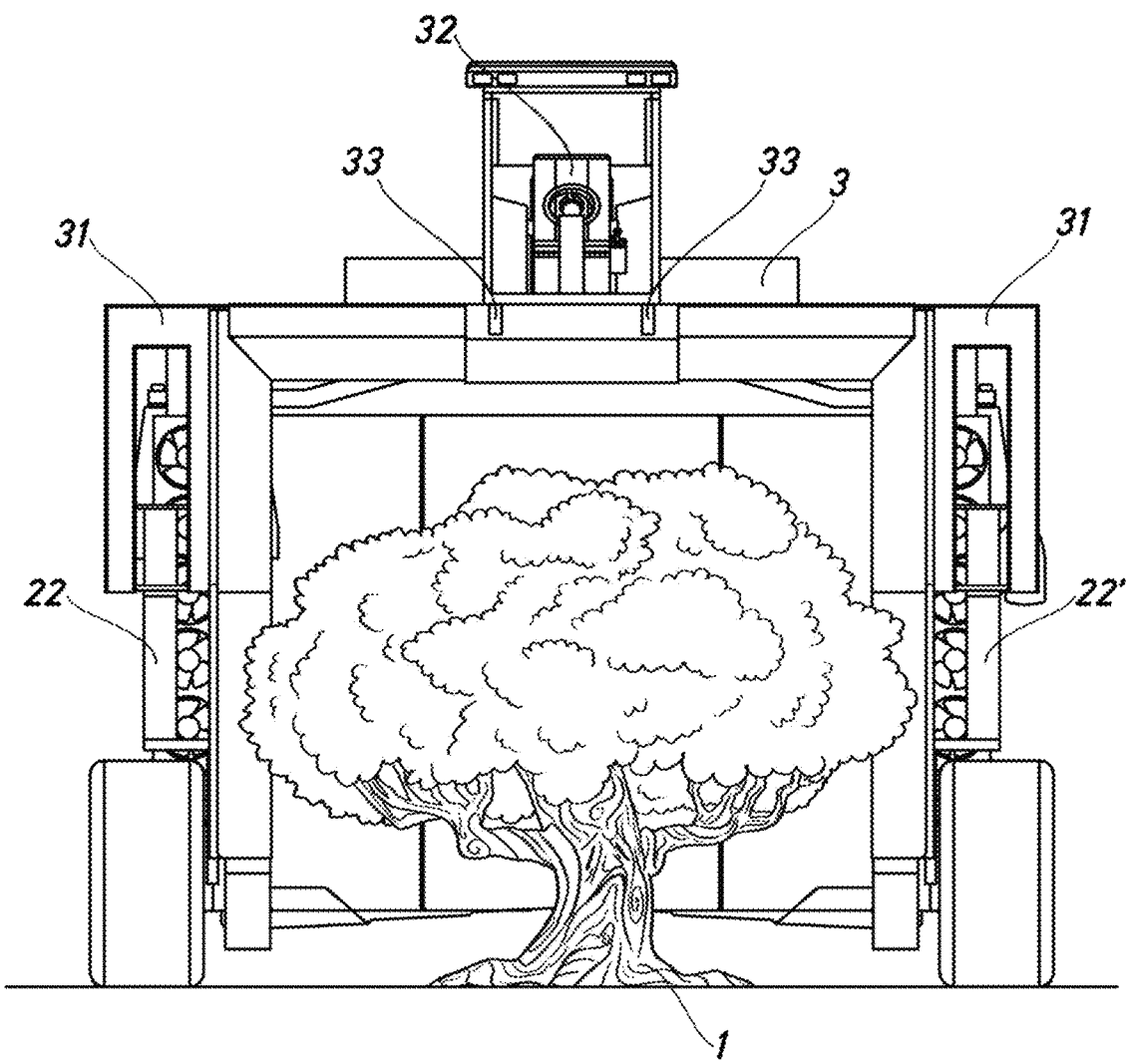
FIG. 15 is a front view of an embodiment of an integrated dual-use machine according to the present invention which consists of a single extendable vehicle moving parallel to a row of fruit trees during the harvesting, bringing down or treatment phase.

One embodiment of a machine according to the present invention as shown in FIG. 15 comprises a single extendable vehicle which is adapted to the dimensions of the field and of the tree -1- to perform the harvesting, bringing down or treatment tasks. The vehicle comprises a structure -31-, which is provided with horizontal extension means, supported by vertical supports -22-, -22'- which allow the vertical movement of the structure -31-. The machine comprises a control station -32- intended to be controlled by an operator, behind which a cover -3- is located. The control station -32- is arranged on guides -33- which allow vertical movement thereof.

Figure 16:
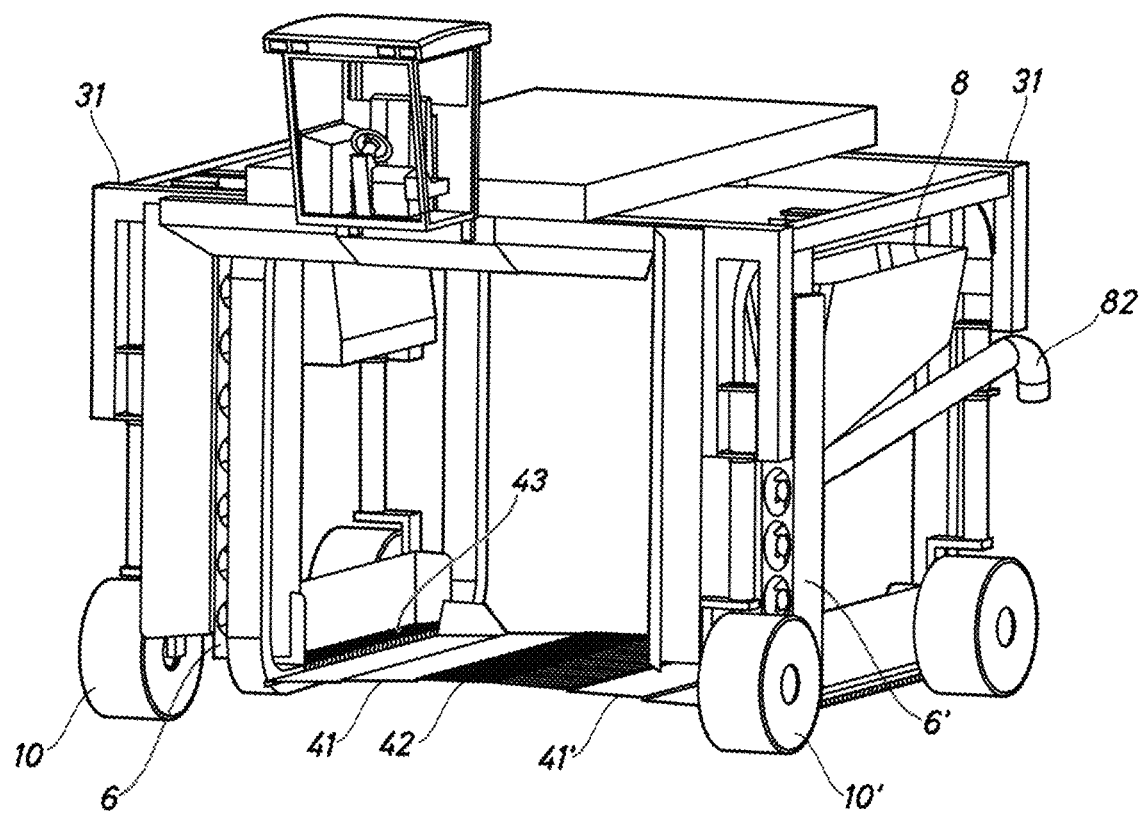
FIG. 16 is a perspective view of the embodiment of an integrated dual-use machine of FIG. 15.

The machine of a single vehicle in FIG. 16 comprises plates -42- which come in contact with the trunk of the tree. The fruits that have been brought down fall onto collection trays -41-, -41'-, which in this case open onto circular collection belts -43- which take the brought down fruit from the trays -41-, -41'- and lift said fruit to a load container -8-. A tube -82- unloads the fruit from said container -8- into, for example, a trailer which is following the vehicle. The air projection devices -6-, -6'- are located on either side of the vehicle.

Figure 17:
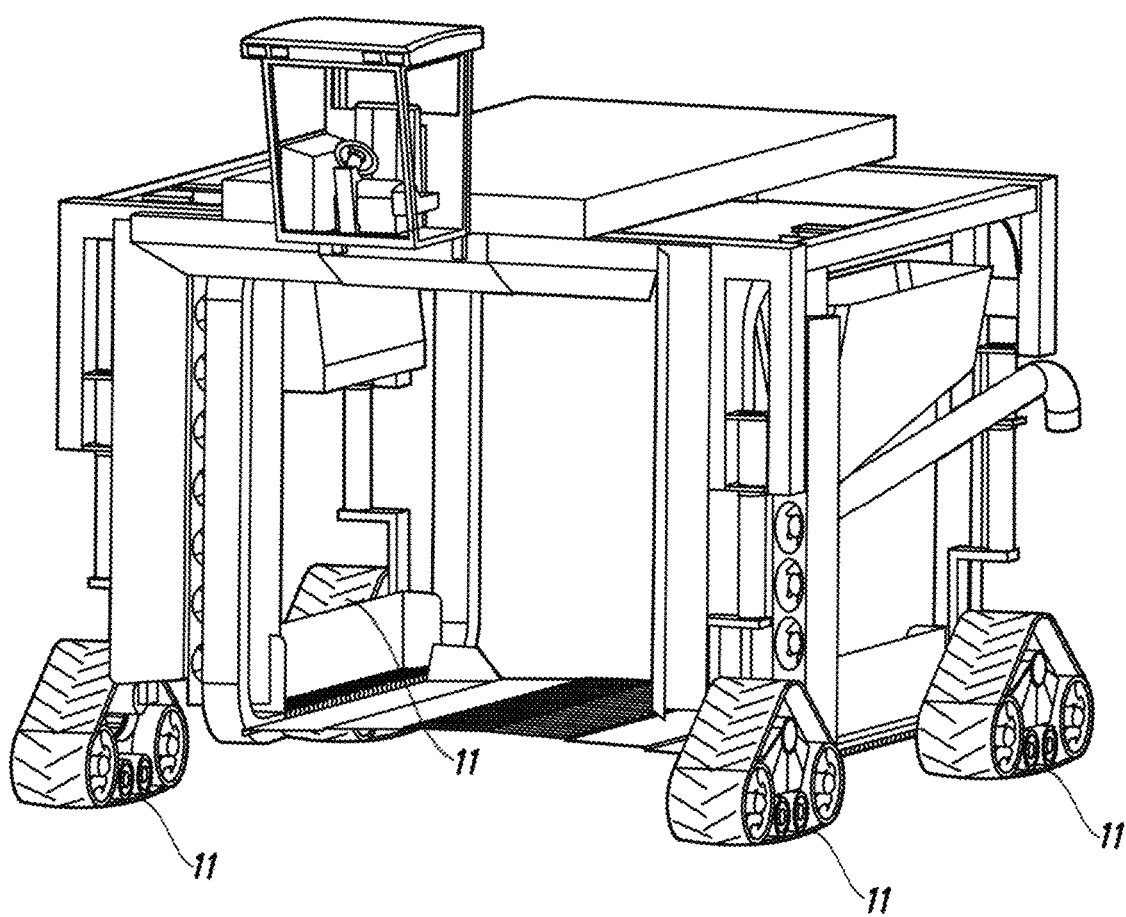
FIG. 17 is a perspective view of the embodiment of an integrated dual-use machine of FIG. 15 provided in this case with traction tracks.

The vehicle is provided with traction by wheels -10-, -10'-, although, as shown in FIG. 17, the vehicle may also be provided with tractor treads -11-.

Figure 18:
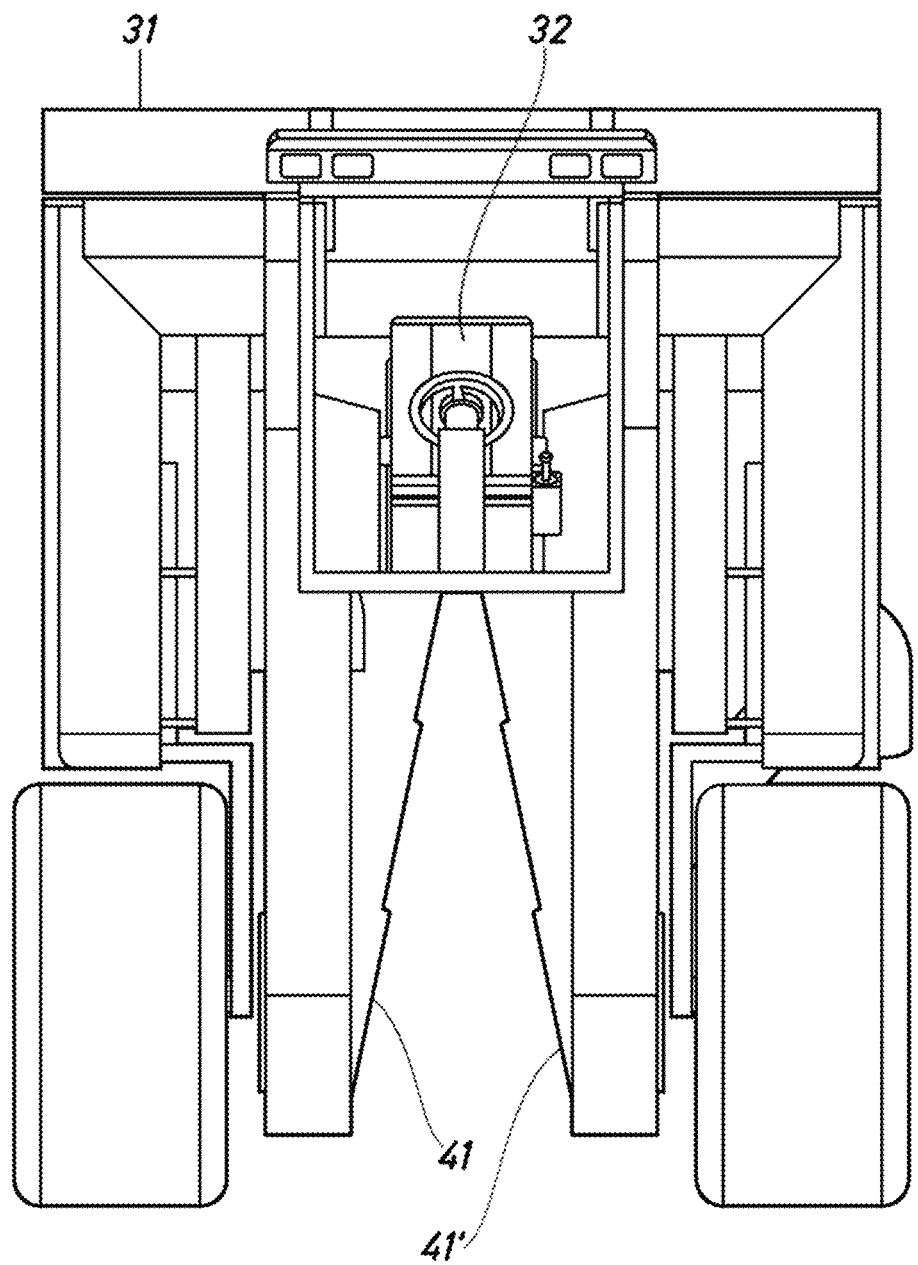
FIG. 18 is a front view of the embodiment of an integrated dual-use machine of FIG. 15 when retracted.

The extendable vehicle can be retracted so as to reduce the dimensions thereof as shown in FIG. 18, where the structure -31- and the control station -32- are in their lowest position. The collection trays -41-, -41'- are folded upwards to allow the structure -31- to be retracted in the horizontal direction as well.

Figure 19:
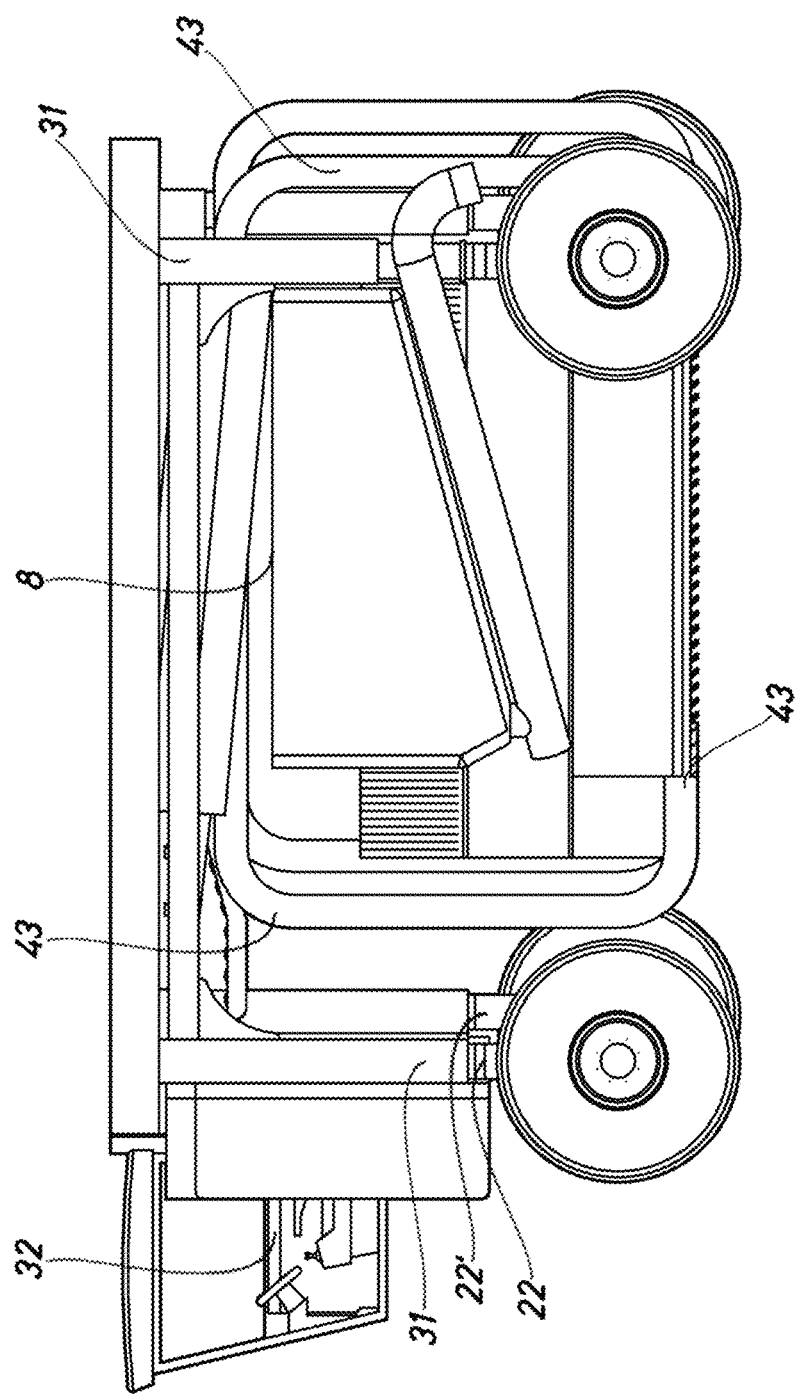
FIG. 19 is a side view of the embodiment of an integrated dual-use machine of FIG. 15 when retracted.

FIG. 19 shows how the collection trays -43- form a closed circuit so as to act both as a collection tray and a conveyor belt, unloading the fruit into a load container -8-. The structure -31- and the control station -32- are in their lowest position, covering most of the vertical supports -22-, -22'-, which slide through the inside of the structure -31- when said structure moves.

Optionally an ultrasonic wave-generating device may be used for bringing down the pieces of fruit.

Both systems for bringing down the fruit may be applied to only one side of a tree or row of trees or alternatively to both sides, whereas the collection (harvesting) of the fruit that has been brought down is always carried out on both sides.

In phytosanitary treatments with recycled spraying in a semi-closed enclosure maximum coverage of the entire volume of the trees and the fruit is guaranteed.

The collection trays may be replaced by rotary belts with portions made of soft materials, which trays are also telescopic and are used for finally sending sensitive and delicate, or flat fruit (such as almonds), by conveyor belts to the load containers, in order to bring down fruit on trees with very low trunk bases or on sloping terrain, whereas rounded fruit (olives and the like) can slide by rolling along inclined planes or ramps.

The shortness of travel of the fruit from falling after being brought down to passing to the loading means, of approximately 20 to 30 seconds, without being knocked or compressed, allows the maximum yield from the harvesting operation. In the case of olive trees, said short travel prevents possible acidity in the oil produced, as the olives harvested using the machine described can pass quickly onto pressing.

Other advantages resulting from the use of the machine described are the mechanical circulation of the fruit harvested from being brought down clean, and the option of using semi-skilled workers, instead of other staff who are more skilled and expert in the selective harvesting operations. The profitability of the harvests is thus increased considerably.

The configuration of the machine, which incorporates autonomous, operationally coordinated, functional devices, but that are different from each other facilitates easy, low-cost maintenance.

With the machine described, no prior preparation (pruning) of the fruit trees is necessary for harvesting the fruit and for the phytosanitary treatment thereof and of the trees themselves.

Although the invention has been described with respect to preferred embodiments, said embodiments should not be considered as limiting the invention, which will be defined by the widest interpretation of the following claims.

What is claimed is:

1. A versatile integrated machine for harvesting fruit on trees, said machine comprising a moveable structure intended to shelter fruit trees therewithin, said moveable structure comprising:
   a collection unit for the fruit that has been brought down, said moveable structure being supported on one or two traction vehicles, said collection unit comprising:
      a) extendable collection trays, made up of flat, overlapping telescopic elements, sloping at variable angles, actuated by cylinders and coupled to the traction vehicles by articulation mechanisms; and
      b) plates associated with a support of the collection unit made up of collection trays which can be coupled to fit around the bases of the trees, said support being provided with devices for projecting air currents to push the fallen fruit toward said collection belts of the traction vehicles,
   said vehicle or each of said vehicles comprising:
      a) at least one device for projecting and orienting air currents with phytosanitary products,
      b) at least one infrared camera,
      c) at least one collection belt,
      d) at least one load container,
      e) at least one conveyor belt configured to receive the fruit coming from the collection belt and to transport the fruit for unloading,
      f) a traction system which actuates,
      g) tractor treads.

2. The versatile integrated machine for harvesting fruit on trees according to claim 1, wherein said moveable structure comprises covers, and mechanical or pneumatic side screens.

3. The versatile integrated machine for harvesting fruit on trees according to claim 1, wherein said devices for projecting and orienting air currents comprise means for controlling the direction and intensity of the currents in accordance with information provided by the at least one infrared camera.

4. The versatile integrated machine for harvesting fruit on trees according to claim 1, wherein said devices for projecting and orienting air currents are arranged on guides which allow said devices to move on said guides in a back-and-forth motion which can be adjusted and is independent of the speed of said traction vehicle.

5. The versatile integrated machine for harvesting fruit on trees according to claim 1, wherein said conveyor belt comprises a vertical belt and a high horizontal belt with a length of approximately the distance between rows of trees.

6. The versatile integrated machine for harvesting fruit on trees according to claim 1, wherein said traction vehicles comprise load containers connected to said collection belt by a conveyor belt, at least one telescopic protective bulkhead, and wheels with tires capable of supporting the vehicle.

7. The versatile integrated machine for harvesting fruit on trees according to claim 2, wherein said screens are mechanical and comprise sensors for the detection of trees or bushes.

8. The versatile integrated machine for harvesting fruit on trees according to claim 6, wherein said wheels with tires are connected to an articulated support which allows said wheels with tires to descend until contact is made with the ground, and also to lift the entire vehicle for transport thereof.

9. The versatile integrated machine for harvesting fruit on trees according to claim 6, wherein said traction vehicles comprise a chassis which can move relative to the wheels with tires and tracks, and self-guiding and control means so as to remain automatically side by side during the operation, said tracks being of the caterpillar tractor type.

10. The versatile integrated machine for harvesting fruit on trees according to claim 2, wherein said covers are foldable and form the upper portions of said moveable structure, said covers being supported by telescopic elements which allow the height of the covers to be adjusted.

11. The versatile integrated machine for harvesting fruit on trees according to claim 1, wherein the elements of the collection unit can be moved from an operational position in which the assembly is applied, with the required incline, to the trees to a non-operational folded position, oriented practically vertically, to allow the machine to be moved.

12. The versatile integrated machine for harvesting fruit on trees according to claim 1, wherein the devices supporting the collection units are, at the same time, blowers for pushing the fruit that has been brought down toward the collection devices.

13. A versatile integrated machine for harvesting fruit on trees, said machine comprising:
   a moveable structure intended to shelter fruit trees therewithin, said moveable structure comprising:
      a collection unit for the fruit that has been brought down, said moveable structure being supported on one or two traction vehicles, said vehicle or each of said vehicles comprising:
         a) at least one device for projecting and orienting air currents with phytosanitary products,
         b) at least one infrared camera,
         c) at least one collection belt,
         d) at least one load container,
         e) at least one conveyor belt configured to receive the fruit coming from the collection belt and to transport for unloading,
         f) a traction system which actuates,
         g) tractor treads,
      wherein said traction vehicles carry controlled-pressure air current generators for bringing down and then moving the fruit brought down and for the operation of the various pneumatic devices, a metering tank for regulating the phytosanitary product in dry or damp powder form, by injecting liquid at the air outlet, and an electric power unit for supplying the electric devices and motors and for the installation of lighting for operating the machine at night.

* * * * *